Aug. 8, 1933. H. T. MATTERN ET AL 1,921,316
EXPANDING MANDREL
Filed Jan. 20, 1930
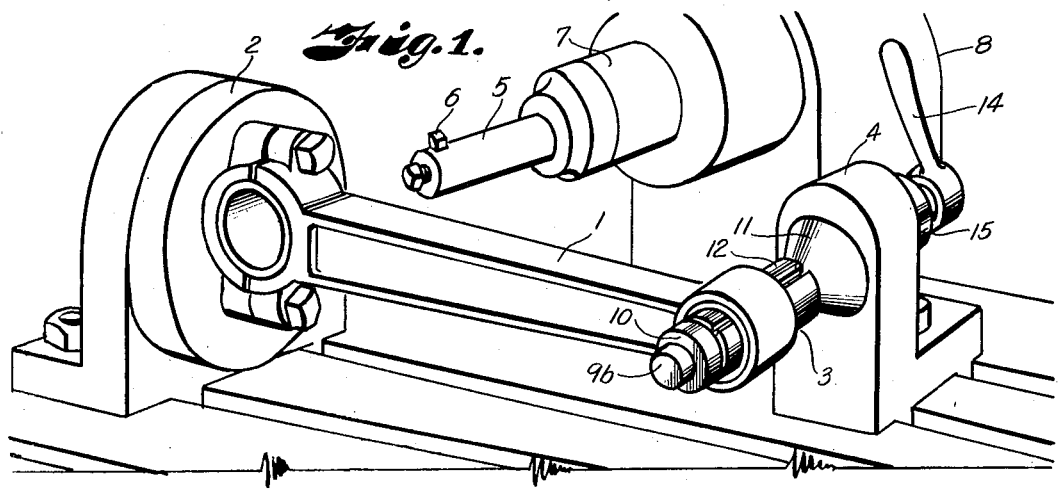
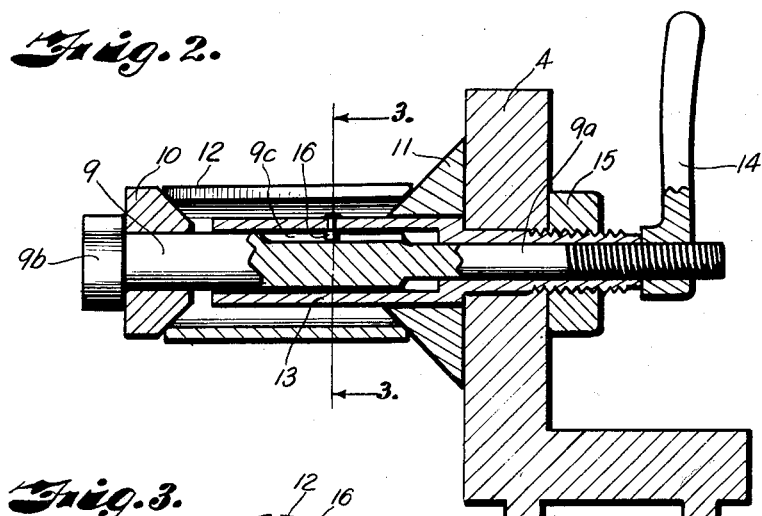
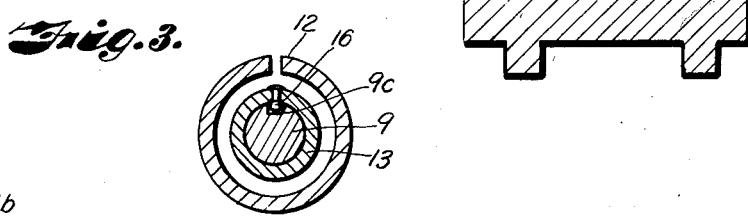
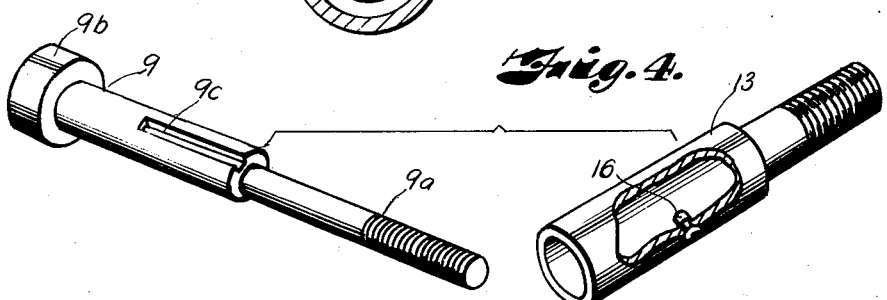
INVENTOR
Herman T. Mattern
and Carl Lindstrom
Thos. E. Scofield
ATTORNEY Patented Aug. 8, 1933

1,921,316

UNITED STATES PATENT OFFICE 1,921,316

EXPANDING MANDREL

Herman T. Mattern and Carl Lindstrom, Kansas City, Mo., assignors to Hempy-Cooper Manufacturing Company, Kansas City, Mo., a Corporation of Missouri Application January 20, 1930. Serial No. 422,036

6 Claims. (Cl. 77—63)

This invention relates to improvements in expanding mandrels and refers more particularly to a mandrel for holding work in a lathe during the machining period. More specifically, the mandrel is particularly adapted to the holding of the wrist pin end of a connecting rod while the crank shaft bearing of the connecting rod is being machined.

It is essential that the axis of the wrist pin and the crank shaft bearing in the connecting rod be in accurate alignment; also it is an advantage to hold the connecting rod during the machining operation rigidly and in a mandrel which may be easily and quickly disassembled.

The expanding mandrel hereinafter described serves these functions and in addition may be quickly placed in position, besides being relatively simple and cheap to manufacture.

Fig. 1 is a perspective view of a connecting rod positioned in a lathe, ready for the machining operation.

Fig. 2 is a sectional view of the mandrel as it is mounted on the tail stock.

Fig. 3 is a view taken along the line 3—3 in Fig. 2, looking in the direction of the arrows.

Fig. 4 is a disassembled view of the mandrel.

Referring to the drawing; a connecting rod 1 is mounted between the chuck 2 and the mandrel, considered as a whole as 3. The mandrel is held in position on the adjustable tail stock 4. The machining of the crank shaft bearing of the connecting rod is done by a suitable boring or machining bar 5 upon which is mounted a tool 6. The bar 5 is held in position on a chuck 7 which is in turn mounted on the lathe diagrammatically shown in 8. The expanding mandrel consists of a draw bolt 9, an outer cone 10, an inner cone 11, a split sleeve 12, a shell 13, and a wrench or handle 14. A lock nut 15 serves to hold the mandrel rigidly in position against the tail stock 4.

One end of the draw bolt is threaded as shown at 9a. The opposite end has an enlarged head 9b. Intermediate the two ends of the bolt is a portion somewhat greater in diameter than the threaded end 9a and of less diameter than the head 9b. This portion has a slotted key way cut therein designated as 9c. The shell portion of the mandrel throughout a portion of its length is bored to fit over the portion of the draw bolt in which the key way is cut. The remaining portion of the sleeve which extends through the tail stock is of somewhat less diameter and has a threaded end upon which is screwed the lock nut 15. By means of this lock nut the shoulder produced by the difference in diameters of the two portions of the sleeve is drawn up rigidly against the tail stock 4.

Through the larger portion of the shell is inserted a pin which extends below the inner surface of the shell and is of a size to slide into the key way 9c of the draw bolt. This prevents the draw bolt or shell from rotating separately when the mandrel is in position. The inner cone 11 fits over the shell, one side of the cone coinciding with the face of the tail stock. Both the tail stock and cone are accurately machined to produce tight engagement of the surfaces.

The outer cone 10 fits over the end of the draw bolt beyond the end of the shell and is held in position by the enlarged head 9b of the draw bolt. The split sleeve 12 is of spring steel and is split throughout its length so that its diameter may be increased or diminished by drawing together or forcing apart the inner and outer cones. The wrench 14 is used to move the outer cone toward or away from the inner cone, due to its engagement with the enlarged head of the draw bolt. The action of the inclined surfaces of the inner and outer cones upon the split sleeve increases or decreases the diameter of the sleeve according to the movement of the outer cone. In other words, by means of the wrench 14, the split sleeve may be expanded to rigidly grip the wrist pin end of the connecting rod while the crank bearing end is being machined. Also the use of an expansible split sleeve assures the contacting of the mandrel throughout the length of the wrist pin bearing of the connecting rod and prevents distortion of the connecting rod during the machining operation. That is, the axes of the wrist pin bearing and crank shaft bearing of the connecting rod are held in rigid alignment.

To disassemble the mandrel or to remove the connecting rod from the mandrel it is only necessary to back off the wrench 14 from the threaded end of the draw bolt, and slide the draw bolt through the tail stock. The release of the outer cone contracts the split sleeve and permits removal of the split sleeve and outer cones from the tail stock at which time the connecting rod bearing may be removed and replaced by another.

It is obvious that this type of mandrel eliminates the necessity of using a separate wrench on the enlarged head of the draw bolt opposite the end upon which is screwed the wrench 14. The elimination of the necessity for using the wrench on the head 9b is brought about by the use of a pin 16 in the shell 13 which registers with the key way 9c of the draw bolt.

This type of mandrel permits the removal of the work without taking down the set-up or removing either the inner or outer cone from the mandrel, as the release of the wrench 14 immediately permits the sliding of the connecting rod from the mandrel. This ability to exchange the outer cone and expanding sleeve without removing the inner cone or draw bolt permits the changing of sizes of the sleeves to accommodate different sizes of connecting rods.

Applicants are cognizant of a prior Patent No. 1,689,484, of which the present invention is an improvement.

We claim as our invention:

1. In an expanding mandrel the combination comprising; a support, a sleeve mounted on said support, an annular cam supported by said sleeve and abutting against said support, a rod telescoped within said sleeve, an enlargement at one end of said rod, an annular cam supported by said rod and seated against said enlargement, expandible means mounted between said cams and means for imparting a longitudinal movement to said rod whereby said expandible means is expanded by said cams.

2. In an expanding mandrel the combination comprising; a support, a sleeve mounted on said support, an annular cam supported by said sleeve, and abutting against said support, a rod telescoped within said sleeve, an enlargement at one end of said rod having a seat, means for preventing relative rotation between said sleeve and said rod, an annular cam supported by said rod and seated against said seat, expandible means mounted between said cams and means for imparting a longitudinal movement to said rod whereby said expandible means is expanded by said cams.

3. In an expanding mandrel the combination comprising; a support, a sleeve mounted on said support, an annular cam supported by said sleeve and abutting against said support, a key on said sleeve, a rod telescoped within said sleeve, an enlargement at one end of said rod having a seat, an annular cam supported by said rod and seated against said seat, a keyway in said rod adapted to receive said key on the sleeve, an expandible sleeve mounted between said cams and means for imparting a longitudinal movement to said rod whereby said sleeve is expanded by said cams.

4. A work holder including in combination a supporting base, an expanding mandrel mounted on said supporting base including a sleeve mounted on said support, an annular cam supported by said sleeve and abutting against said support, a rod telescoped within said sleeve, an enlargement at one end of said rod, an annular cam supported by said rod and seated against said enlargement, expandible means mounted between said cams and means for imparting a longitudinal movement to said rod whereby said expandible means is expanded by said cams.

5. A work holder including in combination a supporting base, an expanding mandrel mounted on said supporting base including a sleeve mounted on said support, an annular cam supported by said sleeve, and abutting against said support, a rod telescoped within said sleeve, an enlargement at one end of said rod having a seat, means for preventing relative rotation between said sleeve and said rod, an annular cam supported by said rod and seated against said seat, expandible means mounted between said cams and means for imparting a longitudinal movement to said rod whereby said expandible means is expanded by said cams.

6. A work holder including in combination a supporting base, an expanding mandrel mounted on said supporting base including a sleeve mounted on said support, an annular cam supported by said sleeve and abutting against said support, a key on said sleeve, a rod telescoped within said sleeve, an enlargement at one end of said rod having a seat, an annular cam supported by said rod and seated against said seat, a keyway in said rod adapted to receive said key on the sleeve, an expandible sleeve mounted between said cams and means for imparting a longitudinal movement to said rod whereby said sleeve is expanded by said cams.

HERMAN T. MATTERN.
CARL LINDSTROM.